US007276138B1

(12) United States Patent
McCord et al.

(10) Patent No.: US 7,276,138 B1

(45) Date of Patent: Oct. 2, 2007

(54) VAPOR GENERATING AND RECOVERY APPARATUS

(76) Inventors: Richard G. McCord, 9101 Nottingham Pkwy., Louisville, KY (US) 40222-5029; Thomas G. McCord, 4554 Laclede Ave., Suite 308, St. Louis, MO (US) 63108-2147

( * ) Notice: Subject to any disclaimer, the term of this patent is extended or adjusted under 35 U.S.C. 154(b) by 381 days.

(21) Appl. No.: 10/462,141

(22) Filed: Jun. 16, 2003

(51) Int. Cl.
*B01D 3/32* (2006.01)
*B08B 7/04* (2006.01)

(52) U.S. Cl. ........................ 202/170; 62/183; 62/238.5; 134/12; 134/31; 134/109; 202/182

(58) Field of Classification Search ................ 202/170, 202/182, 185.5, 185.6; 62/183, 190, 238.5; 134/12, 31, 109
See application file for complete search history.

(56) References Cited

U.S. PATENT DOCUMENTS 2,310,569 A * 2/1943 Booth ........................ 134/12
4,003,798 A 1/1977 McCord
4,029,517 A * 6/1977 Rand ........................ 134/11
4,224,110 A * 9/1980 McCord ..................... 202/169
4,299,663 A 11/1981 McCord
4,414,067 A * 11/1983 McCord ..................... 202/170
4,537,660 A * 8/1985 McCord ..................... 202/170
4,569,727 A * 2/1986 McCord ...................... 203/87
4,778,535 A * 10/1988 McCord ...................... 134/35
4,955,403 A * 9/1990 Zappa et al. ................ 134/109

* cited by examiner

*Primary Examiner*—Virginia Manoharan
(74) *Attorney, Agent, or Firm*—James E. Cole; Middleton Reutlinger

(57) ABSTRACT

A vapor generating and recovery apparatus including a housing having an open top, a closed bottom and a plurality of sidewalls therebetween defining a boiling sump with a treating solution therein. The housing is further provided with at least one heating coil and at least one condensing coil for providing and removing heat from the apparatus. The housing also includes at least one glove extending through one of the sidewalls allowing a user to manually handle and/or manually spray parts or objects needing cleaning using the vapor generating and recovery apparatus.

9 Claims, 1 Drawing Sheet

VAPOR GENERATING AND RECOVERY APPARATUS

BACKGROUND OF THE INVENTION

This invention relates to a vapor generating and recovering apparatus for vaporizing a liquid and condensing a vapor and more particularly relates to an improved apparatus for vaporizing a liquid and condensing a vapor wherein the housing or container of the vapor generating and recovery apparatus includes at least one glove extending through at least one sidewall of the container allowing objects to be manually treated while reducing the amount of vapor loss during the treating process.

In the present state of the art, vapor generating and recovering apparatuses for vaporizing and condensing a liquid are utilized in many different areas. For example, in the cleaning of objects such as metallic tools, plastic parts, and the like, hot or boiling solutions have been utilized to remove undesirable soluble and particulate matters from these tools, parts, and the like, by immersing the soiled object into hot or boiling solution. In bringing the solution to a boiling temperature, a solution vapor zone is created above the boiling solvent solution in the tank or chamber in which the objects may be placed for cleaning. The vaporized solution is then subjected to cooling or condensing means and recovered for re-use.

SUMMARY OF THE INVENTION

It has been found that in most vapor generating and recovering apparatuses for vaporizing a liquid and then condensing the vaporized liquid in the cleaning of objects, when the objects vary in shape such that they require manual treating including rinsing, spraying, cleaning, and drying with vaporized/condensed cleaning solutions, a significant amount of the vaporized solution is lost. Furthermore, the parts may vary in shape to such an extent that the parts require manual handling. Heretofore, no apparatus has allowed for such manual handling and manual spraying within a vapor zone of a vapor generating apparatus. As a result, large costs are associated with spray cleaning using vaporized/condensed solvent solution because of the loss of solvent at the air-vapor interface during such a treating process. Therefore, an apparatus is needed which allows a user to manually handle and/or spray the objects requiring cleaning while the object is disposed in a solution vapor zone.

It is an object of the present invention to provide a vapor generating and recovering apparatus used for cleaning operations to provide means to spray clean, wash, rinse, or otherwise treat objects manually, while the objects are maintained within the apparatus.

It is another object of the present invention to provide means to receive a glove through a sidewall of a vapor generating apparatus which allows operators to insert their hands into the vapor zone while protecting their hands from the heated environment therein. More particularly, the present invention resides in a vapor generating and recovering apparatus which includes a housing having an open top and a closed bottom with cooling means in an upper portion thereof and heating means in a lower portion thereof. The housing includes a vaporizing solution therein. The housing has at least one glove aperture and at least one glove extending through the at least one aperture wherein the glove seals the at least one aperture from environment external to the housing.

It is to be understood that the description of the preferred embodiment of the present invention given hereinafter is not by way of limitation and various modifications within the scope of the present invention will occur to those skilled in the art upon reading the disclosure set forth hereinafter.

BRIEF DESCRIPTION OF THE DRAWING

The aspects and advantages of the present invention will be better understood when the detailed description of the preferred embodiment is taken in conjunction with the accompanying drawings, in which.

DETAILED DESCRIPTION OF THE PREFERRED EMBODIMENTS

Figure 1:
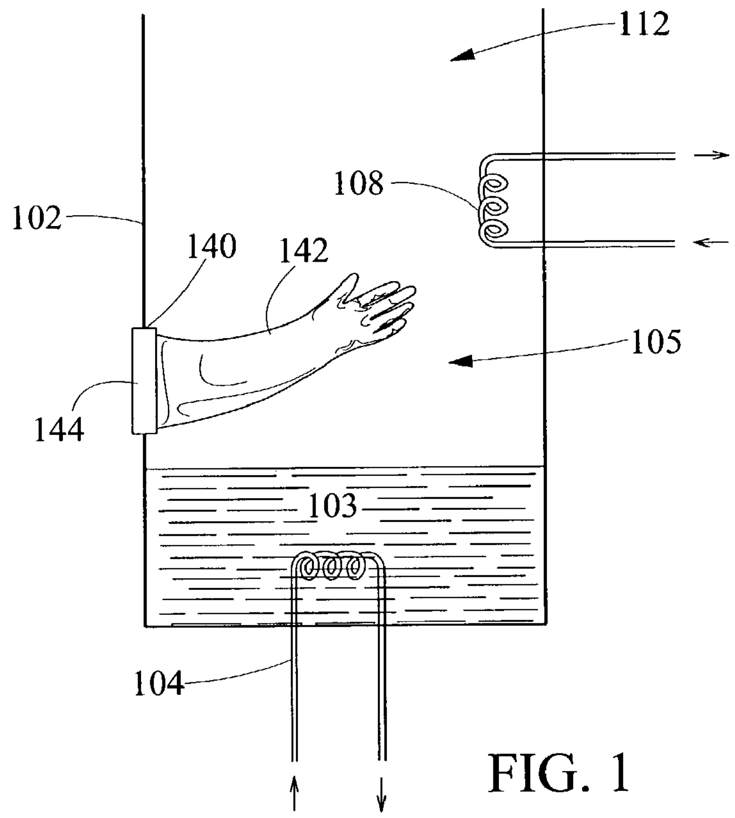
FIG. 1 is a schematic diagram of a preferred vapor generating apparatus for the present invention; and, FIG. 2 is a schematic diagram of one exemplary embodiment of a vapor generating apparatus.

In FIG. 1, a container 102 for vaporizing a liquid solution 103 and condensing the vaporized treating solution 103 in order to provide a vapor zone 105 is provided wherein the treating solution 103 may be a solvent solution. The container 102 has a plurality of sidewalls, a bottom wall, and an open top portion. The container 102 defines a sump wherein the treating solution 103 is disposed. Near the bottom of the container 102 is a first heating coil 104 which provides heat to vaporize the treating solution 103. The heating coil 104 may be electrical, gas, steam, water, or contain a refrigerant therein. Furthermore, heating coil 104 may be in communication with any other well known means for providing constant heat to the liquid within the container 102, such as the system disclosed in U.S. Pat. No. 4,003,798.

Disposed above the liquid 103 is a cooling coil 108, the cooling coil being provided to maintain a preselected temperature in the container below the vaporizing temperature of the liquid 103. The cooling coil 108 defines an upper limit of a vapor zone 105 extending between an upper surface of the liquid 103 and the cooling coil 108. The vapor zone has a temperature dependent upon the type of solution used and according to one embodiment, the temperature ranges between about 100 degrees and 170 degrees Fahrenheit. The cooling coil 108 and the heating coil 104 may be conduits for water, refrigerant, or any other well known heat transfer means. As exemplary with at least one embodiment of the instant invention, one refrigerant may be R134A, which is a commonly used refrigerant and is in compliance with many current environmental regulations. Extending from the cooling coil 108 to an upper portion of the container 102 is a freeboard zone 112, defined as the zone or space between the solution vapor and the top of the container 102.

Figure 2:
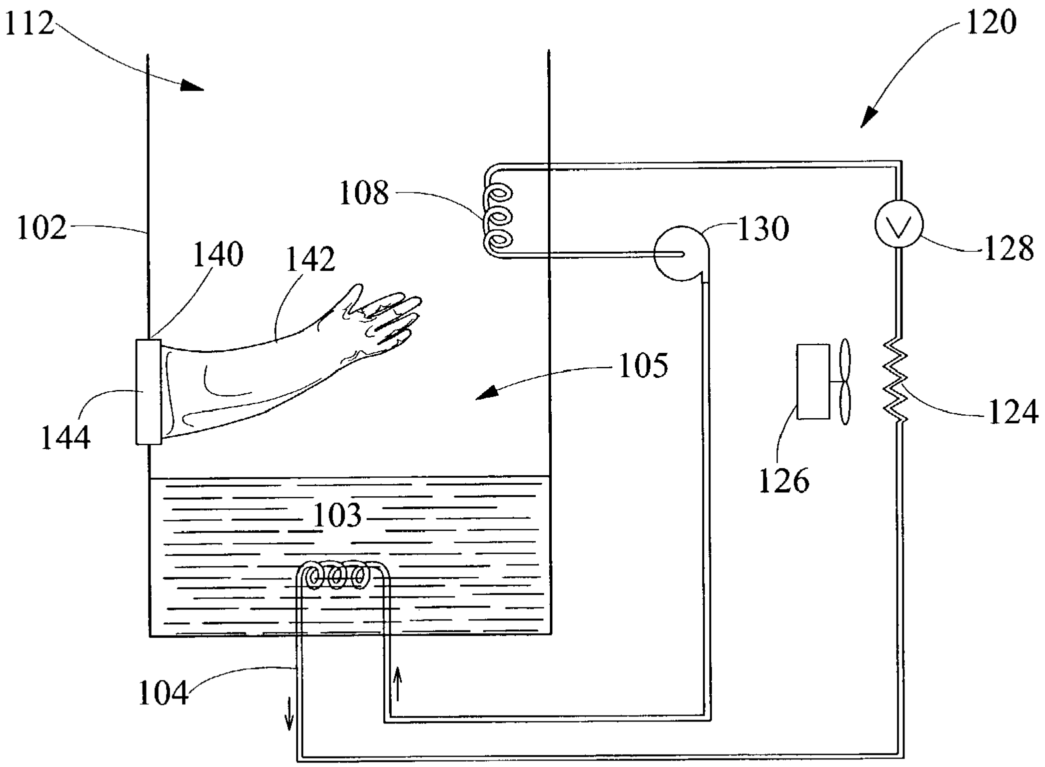

According to a preferred embodiment of the present invention shown in FIG. 2, vapor generation is accomplished by a unidirectional heat pump or refrigeration system 120 having a hot side and a cold side. The hot side of the refrigeration system 120 releases heat through the heating coils 104 into the boiling sump wherein the liquid solution 103 is located in container 102 while the cold side absorbs heat through the condensing coil 108.

The refrigeration system 120 includes a compressor or pump 130 in fluid communication with the heating coil 104 on its high pressure side and in fluid communication with the cooling coils 108 on its low pressure side. The cooling coils 108 are in fluid communication with a heat exchanger 124 which removes excess heat from the system via, according to one method, a fan 126 blowing ambient air over the heat exchangers 124 to remove the heat from the heat transfer fluid. According to a second alternative method, the heat exchanger 124 may include cooling water system utilizing a solenoid to open and close a water valve thereby removing excess heat from the refrigerant. The heat exchanger 124 is in upstream fluid communication with an expansion valve 128 and the cooling coils 108 thereby forming a closed circuit for refrigeration system 120.

The container 102 includes a plurality of sidewalls as well as a bottom wall defining a lower boiling sump containing the treating solution 103. Located in at least one of the sidewalls of the container 102 is at least one glove aperture 140. Extending through the at least one glove aperture 140 is at least one glove 142 which is connected along the outer wall. The at least one glove 142 may also have chemical solvent resistant properties. A clamp 144 or other such device may be used to provide a sealed connection between the at least one glove 142 and the container 102 such that the solution 103 or vapor cannot escape the container through the glove aperture 140. The glove 142 extending into the container 102 allows a user of the vapor generating apparatus to manually handle a part within the solution vapor zone, defined by a location above a pre-selected level for said treating solution and below said at least one condensing coil as well as spray the part in the vapor zone while minimizing the amount of lost solution over known methods of cleaning such objects. The present design further provides protection for operators from breathing vapors or spray of solvent solutions.

In the operation of the apparatus as shown in FIGS. 1 and 2, a basket of metal objects (not shown) may be lowered into the container 102 from the open top portion thereof in either a manual or automated process. A user may then position his or her hands into the container 102 through the gloves 142, and thereby grasp the parts or objects needing treating from the metal basket. A separate spray means (not shown) may be provided which extends into the container 102 and allows spraying of solution, water, or other cleaning, rinsing, or drying solutions or vapors. The spray means may be grasped using one glove while the object or part needing cleaning may be grasped or manipulated using another glove allowing the desired cleaning or treating. After such operation occurs, the parts may be replaced in the metal basket and the basket removed from the container 102.

What is claimed is:

1. A vapor generating and recovering apparatus for treating objects in a vaporizing solution consisting essentially of:

a container therein for vaporizing and condensing a treating solution;

said container having an open top, a closed bottom, and a plurality of sidewalls extending upwardly from said closed bottom;

said container having at least one condensing coil in an upper portion thereof and at least one heating coil in a lower portion thereof;

at least one of said sidewalls having at least one aperture therein in a vapor zone defined by a location above a pre-selected level for said treating solution and below said at least one condensing coil;

a glove extending through said at least one aperture.

2. The apparatus of claim 1 wherein said glove is in sealing relation along a border defining said at least one aperture.

3. The apparatus of claim 2, said sealing relation including a clamp.

4. The apparatus of claim 3 wherein said clamp is a gear clamp.

5. The apparatus of claim 1 wherein said glove includes chemical solvent resistance properties.

6. A vapor generating and recovering apparatus for treating objects in a vaporizing and condensing solvent solution process consisting essentially of:

a housing having a closed bottom with a plurality of upwardly extending sidewalls and a bottom portion defining a sump for a solvent solution and at least one window;

said housing having at least one condensing coil in an upper portion thereof wherein a vapor zone is defined between said solvent solution and said at least one condensing coil;

said housing having at least one heating coil in said bottom portion of said sump;

at least one of said plurality of sidewalls having at least one glove aperture therein in said vapor zone;

at least one a glove extending through said at least one glove aperture in said at least one sidewall and sealing said at least one glove aperture.

7. The apparatus of claim 6, wherein said condensing coil and said heating coil are in a closed refrigeration system, said system including, in fluid communication, an expansion valve and a compressor with said heating and said cooling coils.

8. The apparatus of claim 6, wherein said at least one glove is sealably connected to said at least one glove aperture by a clamp device.

9. The vapor generating apparatus of claim 6, said vapor zone having a temperature of between about 100 degrees Fahrenheit and 170 degrees Fahrenheit.

* * * * *